United States Patent [19]

Middleton

[11] Patent Number: 5,745,567
[45] Date of Patent: Apr. 28, 1998

[54] DETENT ASSEMBLY FOR HOUSING COVER

[75] Inventor: David Desmond Middleton, Raleigh, N.C.

[73] Assignee: Ericsson, Inc., Research Triangle Park, N.C.

[21] Appl. No.: 743,759

[22] Filed: Nov. 7, 1996

[51] Int. Cl.$^6$ ............................................. H04M 1/00
[52] U.S. Cl. ...................................... 379/433; 379/434
[58] Field of Search .................................. 379/433, 434, 379/428; 16/342, 337; 455/90, 375, 347

[56] References Cited

U.S. PATENT DOCUMENTS 5,651,063  7/1997  Ji et al. ............................. 379/434

*Primary Examiner*—Jack Chiang
*Attorney, Agent, or Firm*—Jenkens & Gilchrist, P.C.

[57] ABSTRACT

A pair of embossments provided on either mounting arms of a cover pivotably attachable to a housing or, alternatively, provided on mounting surfaces of the housing, engage specifically defined recesses formed in the member on which the embossments are not formed. The embossments and recesses are all coaxially aligned with respect to an axis passing through a portion of the housing and about which the cover rotates between open and closed positions. The embossments are shaped such that positive engagement in the recess is assured when the cover is at predefined positions, such as the open and closed positions, thus inhibiting movement of the cover from the selected position. The present invention is particularly adaptable to small, portable telecommunications instruments, such as cellular phones having a flip cover, and effectively solves the problem of detent member breakage if the instrument is dropped or the need for costly spring mechanisms.

12 Claims, 3 Drawing Sheets

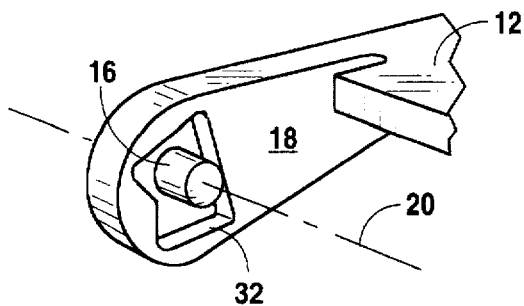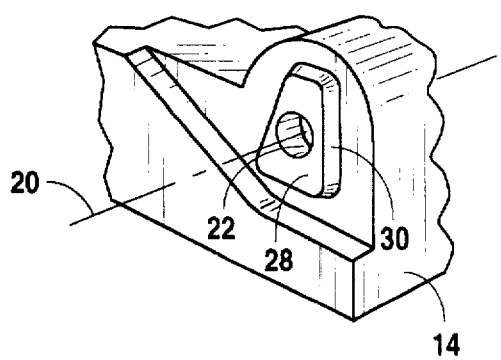
Fig. 8  Fig. 9
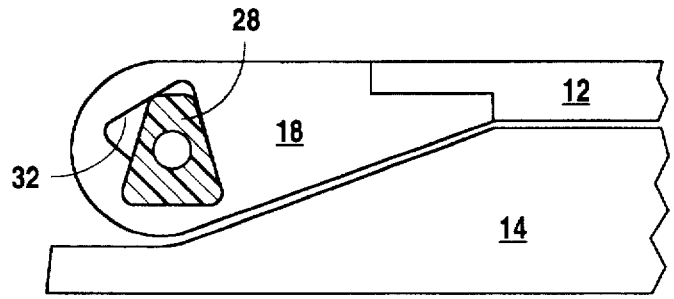
Fig. 10
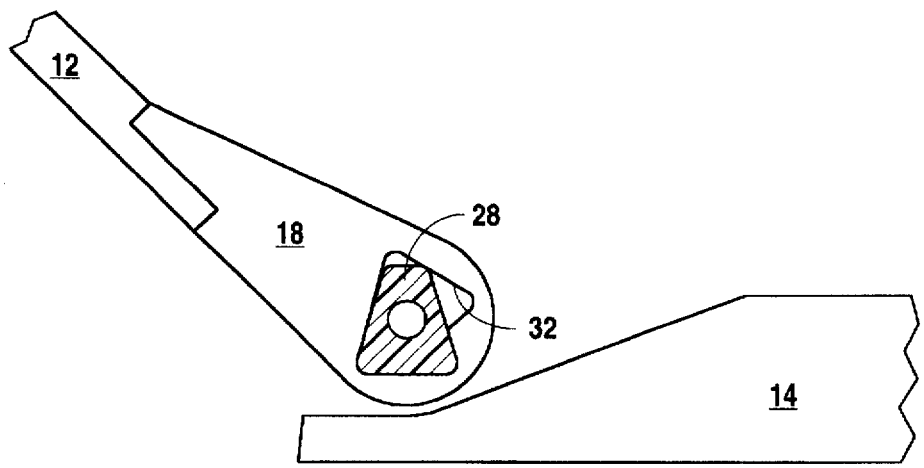
Fig. 11

DETENT ASSEMBLY FOR HOUSING COVER

BACKGROUND OF THE INVENTION

1. Technical Field

This invention relates generally to a detent arrangement for maintaining a cover at predefined positions with respect to a housing, and more particularly to such a detent arrangement for a cover that is pivotably mounted on a housing, such as the flip cover of a portable telecommunication instrument.

2. History of Related Art

Many small portable telecommunications instruments have a cover that can be flipped open when it is desired to use the keypad and other components of the instrument. The flip cover is typically pivotably attached to one end of the case with the speaker being disposed adjacent the opposite end of the case. It is desirable that flip cover when opened, be positioned at an angle, for example from about 135° to 150° from the closed position, to permit unobstructed access to the keypad by the user.

Heretofore, various mechanisms have been used to maintain the flip cover of a cellular phone at the desired open and closed positions. For example, many flip covers use a detent pattern having a single nib, or a short rounded pin, which engages a small dimple formed in an adjacently disposed surface to provide positive location of the flip cover position. This arrangement is prone to wear, and the short nibs, or pins, have a tendency to shear if the instrument is dropped. Alternatively, many flips use spring mechanisms which involve additional moving parts to couple the flip cover to the main housing. The spring mechanisms are more difficult to assemble and have additional parts, both of which add to the cost of the instrument.

The present invention is directed to overcoming the problems set forth above. It is desirable to have a strong, wear-resistant detent arrangement, for positively positioning a cover at predefined positions with respect to a housing, that is not prone to damage if the instrument is dropped. It is also desirable to have such a detent arrangement that does not require the use of spring mechanisms or other components which would contribute to the increased complexity and product cost.

SUMMARY OF THE INVENTION

In accordance with one aspect of the present invention, a detent assembly for a housing cover includes a housing having a pair of substantially parallel, spaced apart mounting surfaces that are positioned normal to an axis extending through a defined portion of the housing. The detent assembly also includes a cover having a pair of spaced apart mounting arms whereby the cover is pivotably attached to the housing for rotation about the axis that extends through a portion of the housing. The cover is rotatable between a closed position at which the cover is disposed in overlying relationship with at least a portion of the housing, and an open position at which the cover is spaced from the housing. A pair of pivot pins, each coaxially aligned with the axis extending through the housing, are individually respectively disposed on either the pair of mounting surfaces on the housing or, alternatively, the pair of mounting arms of the cover. A pair of apertures, each coaxially aligned with the axis extending through a portion of the housing and adapted to receive a respective one of the pivot pins, are respectively formed in either the mounting surfaces on the housing or the mounting arms of the cover, whichever ones that do not include the pivot pins thereon. An embossment extends outwardly from either the mounting surfaces on the housing or the mounting arms of the cover. The embossments have side surfaces defining a peripheral boundary and are positioned so that the axis extending through a portion of the housing also passes through the embossment. Recesses are formed in either the mounting surfaces of the housing or the mounting arms of the cover, whichever ones that do not include the embossments. The recesses have a shape adapted to receive a respective one of the embossments when the cover is at the closed or open positions. Each recess is positioned so that the axis extending through a portion of the housing also passes through the recess.

Other features of the detent assembly embodying the present invention includes the embossments being separately formed insertable members which may be formed of a material having a low coefficient of friction. Other features include the peripheral boundary of each of the embossments defining a rectangular shape, or alternatively, a generally triangular shape.

BRIEF DESCRIPTION OF THE DRAWINGS

A more complete understanding of the structure and operation of the present invention may be had by reference to the following detailed description when taken in conjunction with the accompanying drawings, wherein:

FIG. 8 is a three-dimensional view of one of the mounting arms of a cover, showing another configuration of the detent assembly embodying the present invention;

FIG. 9 is a three-dimensional view of a mounting surface of a housing showing details of the alternate configuration of the detent assembly embodying the present invention;

FIG. 10 is a simplified side view of the alternate configuration of the detent assembly embodying the present invention, showing the cover in a closed position over the housing; and FIG. 11 is a simplified side view of the detent arrangement shown in FIGS. 8 to 10 and embodying the present invention, showing the cover moved to an open position.

DETAILED DESCRIPTION OF PRESENTLY PREFERRED EXEMPLARY EMBODIMENTS

Figure 1:
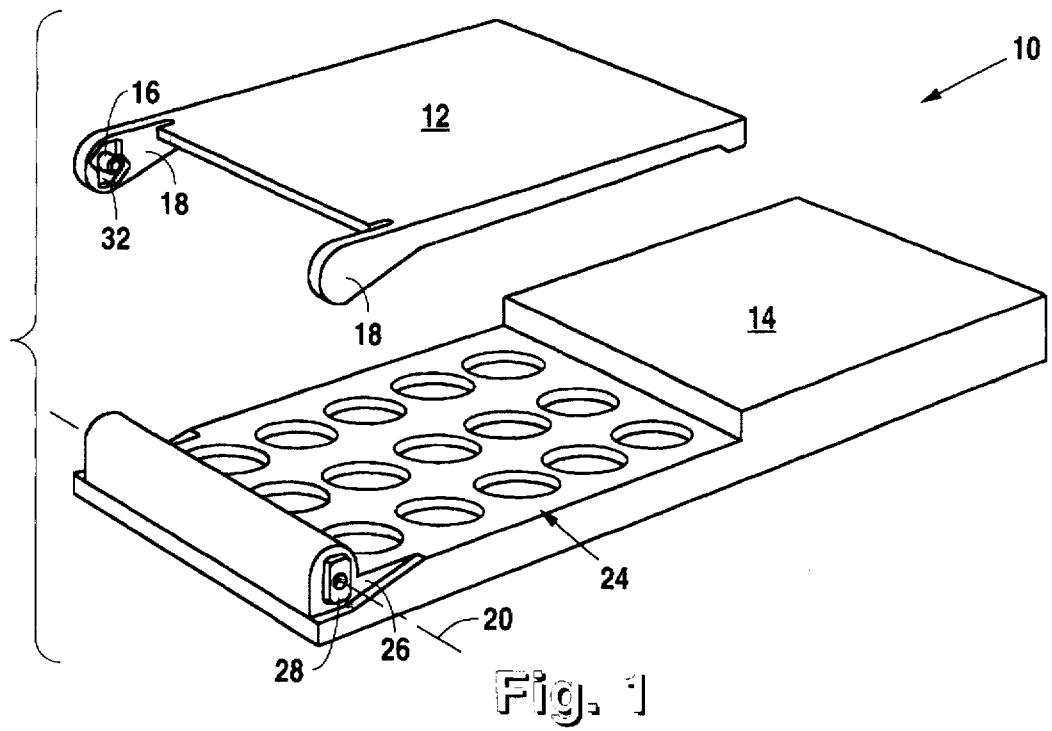
FIG. 1 is a partially exploded, three-dimensional view of a telecommunication instrument having a detent assembly embodying the present invention.

Many portable phones, such as the cellular telephone 10 shown in FIG. 1, utilize a flip door, or cover, 12 to protect the keyboard area of the phone 10 when not in use. Typically, the cover 12 locks in two positions, the first position being the closed position at which the cover overlays the keypad area, and the second, or open position, which is positioned at an angle with respect to the closed position of less than 180°, and generally from about 135° to about 150°. In the detent assembly embodying the present invention, the cover 12 is pivotably attached to a housing, or case, 14 by a pair of pivot pins 16 extending outwardly, respectively, from each of a corresponding pair of mounting arms 18 of the cover 12. Each of the pivot pins 16 is coaxially aligned with an axis 20 that extends through a predefined portion, such as the lower end, of the housing 14. The housing 14 has a keypad 24 disposed therein that is accessible when the cover 12 is moved to an open position. The keypad 24 is thus disposed in the housing 14 and is covered when the cover 12 is moved to a closed position overlaying a corresponding portion of the housing 14.

The housing 14 further includes a pair of spaced apart mounting surfaces 26 that are disposed at the lower end of the housing 14 at a position normal to the axis 20 extending through the housing 14. As shown in FIG. 1, the cover 12 is rotatably mounted on the housing 14 by spreading the mounting arms 18 of the cover 12 apart by a distance sufficient to permit the pivot pins 16 to slide over the mounting surfaces 26 on the housing 14, and snap into respective apertures 22 provided in the mounting surfaces 26 of the housing 14. Thus, the cover 12 is rotatable with respect to the housing, about the axis 20 extending through the housing 14.

Figure 3:
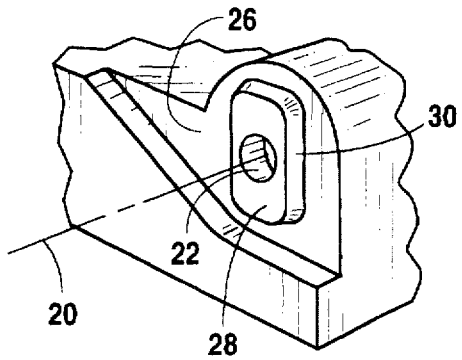
FIG. 3 is a three-dimensional view of a mounting surface on the housing of the instrument shown in FIG. 1, showing another detail of the detent arrangement embodying the present invention.

As shown in FIG. 3, an embossment, or raised surface area, 28 is disposed perpendicularly, i.e., normal, to the axis 20 and extends outwardly from each of the mounting surfaces 26 of the housing 14. The embossment 28 has side surfaces 30 that define the peripheral boundary of the embossment. Each of the embossments 28 are positioned so that the axis 20, extending through a portion of the housing 14, also passes through the embossment 28. Preferably, the embossment 28 is arranged so that the axis 20 passes through the centroid, i.e., the center of surface area, of the embossment 28. In this first-described arrangement, the embossment 28 has a generally rectangular shape, with the pin-receiving aperture 22 formed in the center of the embossment.

Figure 2:
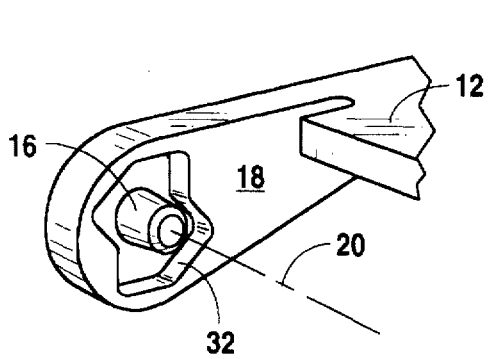
FIG. 2 is a three-dimensional view of one of the mounting arms of the flip cover of the instrument shown in FIG. 1, showing details of a detent arrangement embodying the present invention.
Figure 4:
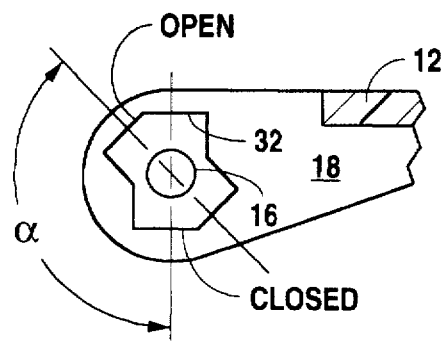
FIG. 4 is a diagrammatic view of the recess formed in a mounting arm of the cover embodying the present invention.

With reference now to FIG. 2, a recess 32 is formed in each of the mounting arms 18 of the cover 12 and disposed normal to the axis 20. The recess 32 has a shape that is adapted to receive the mating embossment 28 when the cover 12 is at the aforementioned closed and open positions. The recess 32 in each of the mounting arms 18 is also positioned so that the axis 20 passing through a portion of the housing 14, also passes through the center of the recess. In this arrangement, it should be noted that the pivot pin 16 is disposed in the center of the recess 32. As shown in FIG. 4, the recess 32 is actually two overlapping rectangularly-shaped openings. When the cover 12 is at the closed position, the bottom side surface of the mating embossment 28 is in abutting contact with the lower surface of the recess 32, identified as "closed." Also, the opposite, or upper side surface of the embossment 28 is in like contact with the opposed upper, parallel surface of the recess 32. When the cover 12 is moved to the open position, the recess 32 rotated in a counter-clockwise direction until the embossment 28 again seats in the recess 32, whereat the earlier identified bottom side surface of the embossment 28 is in contact with the surface identified as "open" in FIG. 4. At the open position, the earlier identified upper side surface of the embossment 28 is in abutting contact with the opposed, lower parallel surface of the recess 32. Thus, the cover 12 moves through an angle α by which the overlapping rectangular openings are offset. Typically, for cellular telephone applications, the angle α has a value of from about 135° to about 150°. As can be noted, if the cover 12 is further rotated to 180°, the rectangular embossment 28 will also be received in the recess 32, but in an inverted position from the closed position.

Preferably, the embossments 28 have a thickness of about 1 mm. Accordingly, each of the recesses 32 have a depth substantially equal to the thickness of the mating embossment 28. When in either the open or closed position, the embossments 28 fit snugly i.e., are seated in non-rotatable, fixed relationship within the mating recess 32. When the cover 12 is rotated to move from one position to the other, the embossments 28 are displaced from their seated position in the corresponding recess 32 and, consequently, the mounting arms 18 are urged away from the adjacent mounting surface 26 and remain in the spread condition until the cover 12 is at the other open or closed position. The pivot pins 16 have a length slightly longer than the thickness of the embossments 28, so that when the cover 12 is rotated and the embossments 28 displaced from their respective seated positions in the recesses 32, the pivot pins 16 will remain engaged in their respective apertures 22 in the housing 14.

Figure 5:
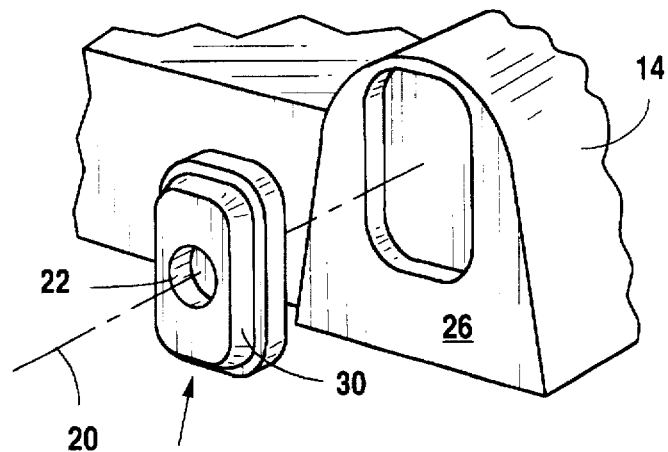
FIG. 5 is a three-dimensional view of an insertable member providing an embossment component of the detent assembly embodying the present invention.

During rotation of the cover 12, there may be a tendency for wear between the surface of the embossment 28 and the surface of the mounting arms 18. For this reason, each of the embossments 28 may be a replaceable insert, as shown in FIG. 5. When formed as a separate insertable member, the embossment 28 may be advantageously formed of a wear-resistant, low-friction material, for example, a thermoplastic or thermoset plastic material such as polytetrafluoroethylene (PTFE), polyetherimide, or acetyl resins. Desirably, the selected material has a coefficient of friction on steel of less than about 0.25.

Figure 6:
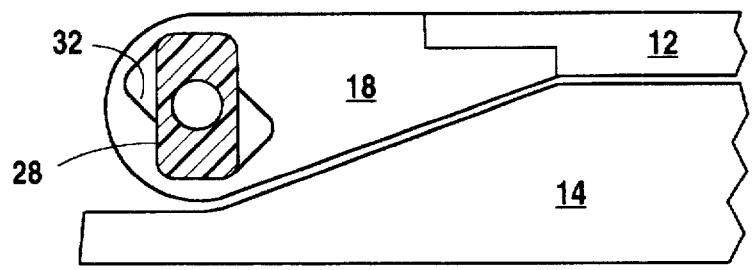
FIG. 6 is a simplified side view of the housing and cover of an instrument having the detent mechanism embodying the present invention, showing the recess in the cover in a plan view and the embossment provided on the housing in section.
Figure 7:
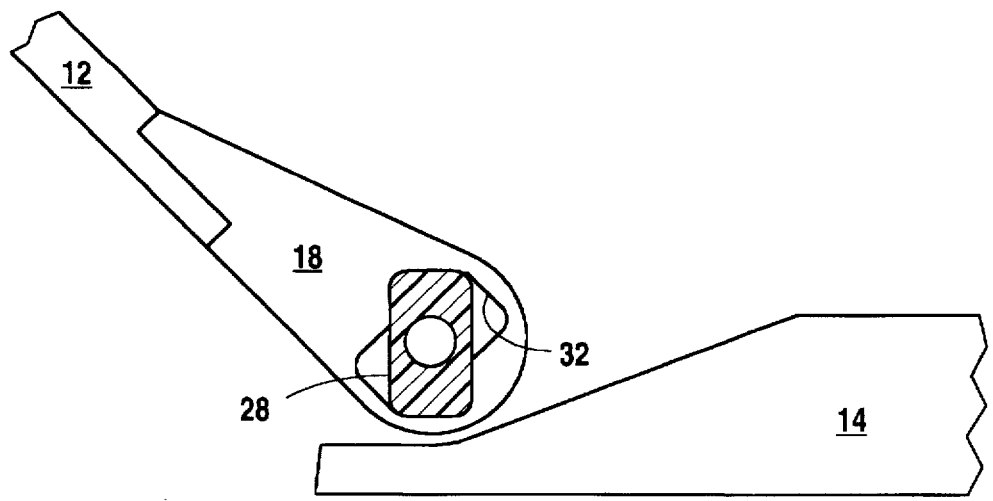
FIG. 7 is a simplified side view of the detent mechanism shown in FIG. 6, with the cover moved to an open position.

The above-described respective position of the recess 32, with respect to the embossment 28 on the housing 14, when the cover 12 is at either the open or closed position, is illustrated in FIGS. 6 and 7. As can be readily seen, the embossment 28 remains at a stationary position while the recess 32 moves in a counter-clockwise direction in accordance with the movement of the cover 12.

In another configuration, shown in FIGS. 8–11, the embossment 28 may have a somewhat truncated, generally triangular shape. In this arrangement, the recess 32 has the shape of two overlapping generally triangular openings, one of which is oriented to receive the generally triangular embossment 28 when the cover is in the closed position, and the other being positioned to receive the embossment 28 when the cover is in the open position.

It should be recognized that the respective placement of the embossments 28 and recesses 32 may be reversed, i.e., an embossment 28 may be provided on each of the mounting arms 18 of the cover 12, and a respective recess 32 formed in each of the mounting surfaces 26 of the housing 14. Also, the illustrated placement of the pivot pins 16 and pin-receiving apertures 22 may be reversed with a pin 16 extending outwardly from each of the mounting surfaces 26 of the housing 14, and a corresponding aperture 22 provided in each of the mounting arms 18 of the cover 12.

Importantly, because the axis of rotation 20 of the cover 12 passes through each of the raised embossments 28, and because the embossments 28 are respectively tightly received within a corresponding recess 32, the pivot pins 16 are protected from breakage in the event that the instrument 10 should be dropped. Desirably, the respective components are designed so that the respective abutting surfaces have a line-to-line contact, with any construction tolerances biased toward a slight interference fit. As can be seen, the above-described detent assembly embodying the present invention also provides reduced wear between the tightly abutting, mating surfaces of the cover 12 and the housing 14. Furthermore, each of the embossments of 28 of the detent assembly embodying the present invention provides much greater cross-sectional area than provided by the pivot pins 16 of the present invention or by a single pin, or nib, and is accordingly very difficult to shear. The embossment geometry also shields the pivot pin from taking excessive shear stress during impact.

Other arrangements of the embossment 28 are also invisioned. In addition to the generally rectangular and triangular embossments and mating recesses described above, other shapes may include non-equilateral trapezoids, parallelograms, ovals, squares, stars, pentagons, and the like. Also, depending on the positions required for the open and closed positions, the selected patterns can be offset by different angles to provide the same effect with different starting and end positions. Also, the recesses 32 may have more than two overlapping shapes corresponding to the embossments 28 if more than two detent positions are desired.

Although the present invention is described in terms of preferred exemplary embodiments, with specific illustrative key constructions and detent shapes, those skilled in the art will recognize that changes in those arrangements and constructions may be made without departing from the spirit of the invention. Such changes are intended to fall within the scope of the following claims. Other aspects, features, and advantages of the present invention may be obtained from a study of this disclosure and the drawings, along with the appended claims.

What I claim is:

1. A detent assembly for a housing cover, comprising:

a housing having a pair of substantially parallel spaced apart mounting surfaces positioned normal to an axis extending through a predefined portion of said housing;

a cover having a pair of spaced apart mounting arms whereby said cover is pivotally attached to said housing for rotation about said axis between a closed position at which the cover is disposed at a position overlying at least a portion of the housing and an open position at which said cover is spaced from said portion of the housing;

a pair of pivot pins, each pin of said pair having a predefined cross-sectional area and being coaxially aligned with the axis extending through said housing and disposed on a predetermined one of said pair of mounting surfaces on the housing and said pair of mounting arms of the cover;

a pair of apertures, each aperture of said pair being coaxially aligned with the axis extending through said housing and adapted to rotatably receive a respective one of said pivot pins, said apertures being respectively formed in the other one of said pair of mounting surfaces on the housing and said pair of mounting arms of the cover;

an embossment extending outwardly from each of the mounting surfaces on the housing and having side surfaces defining a peripheral boundary, each embossment being disposed normal to said axis and positioned so that the axis extending through a portion of the housing also passes through said embossment, and each embossment having a cross-sectional area normal to said axis extending through a portion of said housing that is greater than the cross-sectional area of a respective one of said pivot pins; and a recess formed in each of said mounting arms of the cover normal to said axis extending through a portion of said housing, each of said recesses having a shape adapted to receive a respective one of said embossments when said cover is at said closed and open positions, and each of said recesses being positioned so that the axis extending through a portion of the housing also passes through said recess, said respective embossments being non-rotatably seated within said respective recesses when said cover is at said open and said closed positions, and said respective recesses being urged in a direction away from each other when said cover is moved between said open and said closed positions and are displaced from said seated position within said respective recess.

2. A detent assembly, as set forth in claim 1, wherein said pair of embossments are separately formed insertable members respectively disposed in the mounting surface of the housing.

3. A detent assembly, as set forth in claim 2, wherein said pair of embossments are formed of a material having a coefficient of friction on steel of less than about 0.25.

4. A detent assembly, as set forth in claim 1, wherein the peripheral boundary of each of the embossments defines a generally rectangular shape and said axis passes through the centroid of said generally rectangular shape.

5. A detent assembly, as set forth in claim 1, wherein the peripheral boundary of each of the embossments defines a generally triangular shape and said axis passes through said generally triangular shape.

6. A detent assembly, as set forth in claim 1, wherein said housing comprises a case for a cellular telephone, and said cover comprises a flip cover for said cellular telephone.

7. A detent assembly for a housing cover, comprising:

a housing having a pair of substantially parallel spaced apart mounting surfaces positioned normal to an axis extending through a predefined portion of said housing;

a cover having a pair of spaced apart mounting arms whereby said cover is pivotally attached to said housing for rotation about said axis between a closed position at which the cover is disposed at a position overlying at least a portion of the housing and an open position at which said cover is spaced from said portion of the housing;

a pair of pivot pins, each pin of said pair having a predefined cross-sectional area and being coaxially aligned with the axis extending through said housing and disposed on a predetermined one of one of said pair of mounting surfaces on the housing and said pair of mounting arms of the cover;

a pair of apertures, each aperture of said pair being coaxially aligned with the axis extending through said housing and adapted to rotatably receive a respective one of said pivot pins, said apertures being respectively formed in the other one of said pair of mounting surfaces on the housing and said pair of mounting arms of the cover;

an embossment extending outwardly from each of the mounting arms of said cover, each embossment being disposed normal to said axis and having side surfaces defining a peripheral boundary, each embossment being positioned so that the axis extending through a portion of the housing also passes through said embossment, and each embossment having a cross-sectional area normal to said axis extending through a portion of said housing that is greater than the cross-sectional area of a respective one of said pins; and a recess formed in each one of the pair of mounting surfaces disposed on said housing, each of said recesses being positioned normal to said axis extending through a portion of said housing and having a shape adapted to receive a respective one of said embossments when said cover is at said closed and open positions, and each recess being positioned so that the axis extending through a portion of the housing also passes through said recess, said respective embossments being non-rotatably seated within said respective one of said recesses when said cover is at said open and said closed positions and being displaced from said seated position within said respective recess and urged in a direction away from each other when said cover is moved between said open and said closed positions.

8. A detent assembly, as set forth in claim 7, wherein said pair of embossments are separately formed insertable members respectively disposed in the mounting surface of the housing.

9. A detent assembly, as set forth in claim 8, wherein said pair of embossments are formed of a material having a coefficient of friction on steel of less than about 0.25.

10. A detent assembly, as set forth in claim 7, wherein the peripheral boundary each of the embossments defines a generally rectangular shape and said axis passes through the centroid of said generally rectangular shape.

11. A detent assembly, as set forth in claim 7, wherein the peripheral boundary of each of the embossments defines a generally triangular shape and said axis passes through said generally triangular shape.

12. A detent assembly, as set forth in claim 7, wherein said housing comprises a case for a cellular telephone, and said cover comprises a flip cover for said cellular telephone.

* * * * *